US007444588B2

(12) United States Patent
Hill et al.

(10) Patent No.: US 7,444,588 B2
(45) Date of Patent: Oct. 28, 2008

(54) METHODS, SYSTEMS, AND STORAGE MEDIUMS FOR PROVIDING MULTI-MEDIA CONTENT STORAGE AND MANAGEMENT SERVICES

(75) Inventors: Timothy A. Hill, Roswell, GA (US); Marie McMenamin, Marietta, GA (US); Zakir Patrawala, Atlanta, GA (US); Mukesh K. Singh, Dunwoody, GA (US)

(73) Assignee: AT&T Intellectual Property, I.L.P., Wilmington, DE (US)

( * ) Notice: Subject to any disclaimer, the term of this patent is extended or adjusted under 35 U.S.C. 154(b) by 406 days.

(21) Appl. No.: 10/911,864

(22) Filed: Aug. 5, 2004

(65) Prior Publication Data

US 2006/0031770 A1  Feb. 9, 2006

(51) Int. Cl.
G06F 17/00 (2006.01)
(52) U.S. Cl. .................... 715/255; 715/204; 705/77
(58) Field of Classification Search ........... 715/501.1, 715/513, 234, 205, 273, 255; 705/77
See application file for complete search history.

(56) References Cited

U.S. PATENT DOCUMENTS

| 5,513,117 | A  | * | 4/1996  | Small ................... 700/233 |
| 5,557,320 | A  |   | 9/1996  | Krebs |
| 5,847,760 | A  |   | 12/1998 | Elmaliach et al. |
| 6,931,444 | B2 |   | 8/2005  | Schweitzer |
| 6,934,745 | B2 |   | 8/2005  | Krautkremer |
| 6,975,594 | B1 |   | 12/2005 | Byers |
| 6,976,003 | B1 |   | 12/2005 | Hamor et al. |
| 7,113,479 | B2 |   | 9/2006  | Wong |
| 7,124,195 | B2 |   | 10/2006 | Roach et al. |
| 7,149,892 | B2 |   | 12/2006 | Freed et al. |
| 7,171,485 | B2 |   | 1/2007  | Roach et al. |
| 2001/0005837 | A1 | * | 6/2001  | Kojo ..................... 705/51 |
| 2002/0054059 | A1 | * | 5/2002  | Schneiderman ........ 345/700 |
| 2002/0103895 | A1 |   | 8/2002  | Chiang |
| 2002/0116488 | A1 |   | 8/2002  | Subramanian et al. |
| 2002/0188732 | A1 |   | 12/2002 | Buckman et al. |
| 2003/0005112 | A1 |   | 1/2003  | Krautkremer |
| 2003/0014462 | A1 |   | 1/2003  | Bennett et al. |
| 2003/0023721 | A1 |   | 1/2003  | Vinberg |
| 2003/0023722 | A1 |   | 1/2003  | Vinberg |
| 2003/0069964 | A1 |   | 4/2003  | Shteyn et al. |
| 2003/0074439 | A1 |   | 4/2003  | Grabamik et al. |

(Continued)

OTHER PUBLICATIONS

Chaudbury, Abhijit, et al, "Web Channels in E-Commerce", Communications of the ACM, vol. 44, Issue 1, Jan. 2001, pp. 99-104.*

(Continued)

*Primary Examiner*—Laurie Ries
(74) *Attorney, Agent, or Firm*—Cantor Colburn LLP

(57) ABSTRACT

Exemplary embodiments include methods, systems, and storage mediums for providing multi-media content storage and management services. From a single user interface, the method includes creating a library of content items including at least one of a photo library and a video library, creating at least one other content item including at least one of a web page, newsletter, message board, email, instant message, chat room text message, and electronic greeting, associating at least one component of the library with the at least one other content item to form an arrangement, and designating access restrictions to the arrangement. The access restrictions include the option of applying no restriction.

14 Claims, 13 Drawing Sheets

U.S. PATENT DOCUMENTS

| | | | |
|---|---|---|---|
| 2003/0074445 A1 | 4/2003 | Roach et al. | |
| 2003/0074474 A1 | 4/2003 | Roach et al. | |
| 2003/0078939 A1* | 4/2003 | Ma | 707/104.1 |
| 2003/0084145 A1 | 5/2003 | Ramachandran et al. | |
| 2003/0084147 A1 | 5/2003 | Gourraud | |
| 2003/0084150 A1 | 5/2003 | Hansen et al. | |
| 2003/0229720 A1 | 12/2003 | Kiremidjian et al. | |
| 2003/0233422 A1* | 12/2003 | Csaszar et al. | 709/206 |
| 2004/0015776 A1* | 1/2004 | Scott | 715/500 |
| 2004/0093513 A1 | 5/2004 | Cantrell et al. | |
| 2004/0111308 A1 | 6/2004 | Yakov | |
| 2004/0199604 A1 | 10/2004 | Dobbins et al. | |
| 2004/0199667 A1 | 10/2004 | Dobbins | |
| 2004/0201752 A1* | 10/2004 | Parulski et al. | 348/231.99 |
| 2004/0230678 A1 | 11/2004 | Huslak et al. | |
| 2004/0252698 A1 | 12/2004 | Anschutz et al. | |
| 2005/0015493 A1 | 1/2005 | Anshutz et al. | |
| 2005/0015494 A1 | 1/2005 | Adamcyzk et al. | |
| 2005/0021716 A1 | 1/2005 | Adamcyzk et al. | |
| 2005/0021739 A1 | 1/2005 | Carter et al. | |
| 2005/0025136 A1 | 2/2005 | Anshutz et al. | |
| 2006/0020525 A1* | 1/2006 | Borelli et al. | 705/34 |
| 2006/0025219 A1* | 2/2006 | Nassef et al. | 463/42 |
| 2006/0031770 A1 | 2/2006 | McMenamin | |
| 2006/0208074 A1* | 9/2006 | Eglen et al. | 235/383 |
| 2007/0100981 A1 | 5/2007 | Adamcyzk et al. | |
| 2007/0112956 A1 | 5/2007 | Chapman et al. | |

OTHER PUBLICATIONS

Battarbee, Katja, "Recording Experience Through Images: Defining Co-Experience", Proceedings of the 2003 International Conference on Designing Pleasurable Products and Interfaces DPPI '03, Jun. 2003, pp. 109-113.*

"BellSouth Teams with MyWay.com to Launch Next Generation Internet Portal", Business Wire, Dec. 8, 1999, http://www.findarticles.com/p/articles/mi_m0EIN/is_1999_Dec_8/al_58086123.

Bellsouth Teams with Myway.com to Launch Next Generation Internet Portal, [online]; [retrieved on Oct. 30, 2007]; retrieved from the Internet http://findarticles.com/articles/mi_mOEIN/is_1999_Dec 8/ai_58113-652-8/03/0006.

Defining Co-Experience, Katja Battarbee, DPPI/03, Jun. 23-26, 2003, Pittsburgh, PA, USA, Copyright 2003 ACM 1-588113-652-8/03/0006.

Web Channels In E-Commerce, Chaudhury et al., Communications of the ACM, Jan. 2001, vol. 44 No. 1, pp. 99-104.

An Architecture for Differentiated Services, [online]; [retrieved on Oct. 30, 2007]; retrieved from the Internet http://www.ietf.org/rfc/rfc2475.txt.

DSL Evolution- Architecture Requirements for the Support of QoS-Enabled IP Services, Aug. 2002, Proposed Draft, PD-00X, Revision 1.0.

DSL Evolution- Architecture Requirements for the Support of QoS-Enabled IP Services, Dec. 2002, Working Text WT-081, Revision 4.

DSL Evolutoin- Architecture Requirements for the Support of QoS-Enabled IP Services, Feb. 2003, Working Text, WT-081, Revision 5.

DSL Evolutoin- Architecture Requirements for the Support of QoS-Enabled IP Services, Mar. 2003, Working Text, WT-081, Revision 6.

DSL Evolutoin- Architecture Requirements for the Support of QoS-Enabled IP Services, Mar. 2003, Working Text, WT-081, Revision 7.

DSL Evolutoin- Architecture Requirements for the Support of QoS-Enabled IP Services, Mar. 2003, Working Text, WT-081, Revision 8.

DSL Evolutoin- Architecture Requirements for the Support of QoS-Enabled IP Services, Jun. 2003, Working Text, WT-081, Letter Ballot, Revision 9.

DSL Evolutoin- Architecture Requirements for the Support of QoS-Enabled IP Services, DSL Forum, TR-059, Sep. 2003.

Who We Are: Staff, [online]; [retrieved on Aug. 3, 2007]; retrieved from the Internet http://www.dslforum.org/about/staff.shtml.

* cited by examiner

METHODS, SYSTEMS, AND STORAGE MEDIUMS FOR PROVIDING MULTI-MEDIA CONTENT STORAGE AND MANAGEMENT SERVICES

BACKGROUND OF INVENTION

The present invention relates generally to online services, and more particularly, to methods, systems, and storage mediums for providing multi-media content storage and management services over a network.

Advancements in the networking technologies have stimulated the development of new ways of communicating. For example, network communications include email, instant messaging, chat rooms, message boards, and text messaging, to name a few. Advancements in technologies have also provided consumers with new tools for managing their electronic content such as digital photos, videos, music, etc. Service providers generally offer a limited set of services to its customers for implementing these types of communications and managing their content, primarily because of the obstacles they face in handling the various types of content (e.g., text, images, video, audio, etc.) and the very different system and software requirements associated with managing these types of content. As a result, consumers must choose a service provider and/or service system that best meet their individual needs, which may force the consumers to forego other desired services.

What is needed, therefore, is a way to integrate multi-media content items and services that enable individuals to manage and communicate these items within the context of a single system and service.

SUMMARY OF INVENTION

Exemplary embodiments of the invention include methods, systems, and storage mediums for providing multi-media content storage and management services over a network. From a single user interface, the methods include creating a library of content items including at least one of a photo library and a video library, creating at least one other content item including at least one of a web page, newsletter, message board, email, instant message, chat room text message, and electronic greeting, associating at least one component of the library with the at least one other content item to form an arrangement, and designating access restrictions to the arrangement. The access restrictions include the option of applying no restriction.

Exemplary embodiments of the invention also include a computer system having a graphical user interface including a display and a selection device and a method of providing and selecting from a menu on the display. The method includes creating a library of content items including at least one of a photo library and a video library, creating at least one other content item including at least one of a web page, newsletter, message board, email, instant message, chat room text message, and electronic greeting, associating at least one component of the library with the at least one other content item to form an arrangement, and designating access restrictions to the arrangement. The access restrictions include the option of applying no restriction.

Exemplary embodiments further include systems for providing multi-media content storage and management services over a network. Systems include a host system comprising at least one server executing a web server application, a real-time media delivery application, and a multi-media content storage and management application. Systems also include a link to a client system. The multi-media content storage and management application provides a user interface to the client system and is operable for enabling the client system to create a library of content items including at least one of a photo library and a video library, create at least one other content item including at least one of a web page, newsletter, message board, email, instant message, chat room text message, and electronic greeting, associate at least one component of the library with the at least one other content item to form an arrangement, and designate access restrictions to the arrangement. The access restrictions include the option of applying no restriction.

Exemplary embodiments also include storage mediums including machine-readable program code for providing multi-media content storage and management services over a network. The program code includes instructions for causing a computer to implement a method. The method includes creating a library of content items including at least one of a photo library and a video library, creating at least one other content item including at least one of a web page, newsletter, message board, email, instant message, chat room text message, and electronic greeting, associating at least one component of the library with the at least one other content item to form an arrangement, and designating access restrictions to the arrangement. The access restrictions include the option of applying no restriction.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF DRAWINGS

Referring now to the drawings wherein like elements are numbered alike in the several FIGURES.

DETAILED DESCRIPTION

Figure 1:
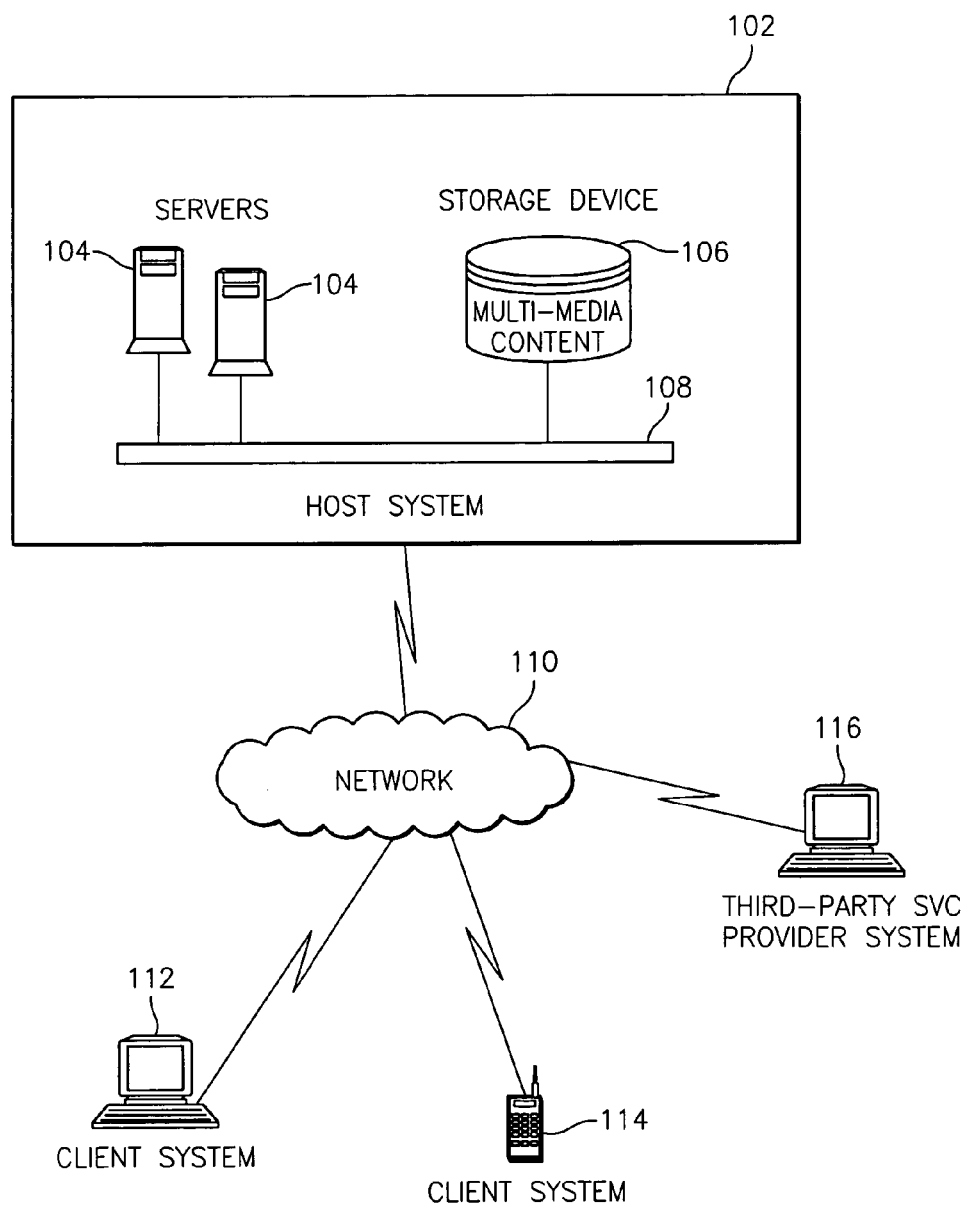
FIG. 1 illustrates a system upon which the multi-media content storage and management system may be implemented in exemplary embodiments.

The multi-media content storage and management system merges a variety of different services into a single user interface for providing a comprehensive and efficient means for creating, communicating, and managing multi-media content materials. In accordance with exemplary embodiments, a system for providing multi-media content storage and management services will now be described with respect to FIG. 1. The system of FIG. 1 includes a host system 102 comprising servers 104 and a data storage device 106. In exemplary embodiments, host system 102 refers to an entity providing at least a portion of the multi-media content and storage management services as described further herein. Host system 102 may comprise a service provider such as an Internet service provider, web hosting service provider, a web portal provider, or similar type of business enterprise. As shown and described with respect to FIG. 1, host system 102 is an Internet service provider that provides a web portal, web hosting services, messaging services, as well as the multi-media content storage and management services to its customers. Host system 102 provides a web portal interface for its customers through which various services may be accessed and implemented. The web portal interface may include general information and links to external sources of information and may also provide the main interface for initiating the services available through the multi-media content storage and management system.

Servers 104 may comprise any suitable high-speed processors or combination of processors for handling the volume of activities conducted on behalf of customers of the host system 102. Servers 104, for example, may comprise a Real Helix™ server by RealNetworks, Inc., of Seattle, Wash. Servers 104 may also include a web hosting server application, one or more messaging server applications, and database management server applications for handling the content in data storage device 106. Messaging applications may include email, text messaging, chat rooms, message boards, newsletters, instant mail, etc. One or more of servers 104 may also execute a billing application, a firewall or security software, content editing tools, and an application for providing the multi-media content and storage management services. The billing application may be linked to the multi-media content storage and management system whereby customers are billed for the services provided by the multi-media content storage and management system as well as other network services (e.g., Internet access, web hosting, music downloads, etc.)

One or more of servers 104 may also provide customers with a link to a domain name registration service provider for establishing a domain name. The multi-media content storage and management system provides customers with a single interface for implementing a variety of services such as online storage of digital, video, and/or audio content, web hosting services, messaging services, music selection and storage, and provides templates for creating content arrangements, accessing external resources over a network 110, and communicating created content arrangements to others. These features are described further herein.

Servers 104 may communicate with storage device 106 over a network 108 such as an Intranet, Extranet, local area network, or similar networking topology. Storage device 106 houses content provided by customers and provides access to the content upon request to the customers and the customers' designated recipients. Content includes, e.g., digital images and albums, video and video libraries, audio libraries, etc. Storage device 106 may also store a music base, movie base, and/or computer games for selection by customers as will be described further herein. Large downloads/uploads relating to image files and video files may be facilitated by a turbo feature incorporated into the multi-media content storage and management system as described further herein.

Client devices 112-114 are also included in the system of FIG. 1 in accordance with exemplary embodiments. Client devices 112-114 refer to devices operated by customers of host system 102. Client devices 112-114 may include wireline computer devices, wireless mobile computing devices and telephones, and similar network-enabled devices. A mobile telephone client device may include a built-in digital camera/video recorder and features for transmitting images, video and sound by telephone to host system 102. Similarly, a digital/video camera may be coupled to a computer client device whereby images/video (and audio) is uploaded to host system 102.

Client devices 112-114 may communicate with host system 102 over a communications network such as a packet-switched network (Internet, Extranet, Virtual Private Network) using various packet-switching technologies such as Internet Protocol (IP), frame relay, asynchronous transfer mode (ATM), among others. Client devices may also communicate over a wireless network, e.g., a cellular or satellite communications network. Client devices 112-114 access the network 110 via, e.g., a modem and dial up service, broadband cable Internet service, wireless service provider, etc. Client devices 112-114 may include web browsers, messaging applications, content player applications (e.g., video and/or audio), and may also execute a portion of the multi-media content storage and management system as described further herein. Internet enabled, web browser, downloaded invention software, repository for media (digital images, video), media player, digital camera, video camera with upload ability to transfer media to computer; telephone may have built in camera and wireless service provider for sending images and video over network to host system;

Host system 102 may outsource a portion of the services it offers to third party service provider systems such as service provider system 116 as shown in the system of FIG. 1. For example, third party service provider system 116 may provide streaming video services to customers of host system 102. Alternatively, third party service provider system 116 may provide digital image processing services such as those provided by Ofoto, Inc., of Emeryville, Calif., Snapfish, Inc. of San Francisco, Calif., or other similar service provider entities.

The multi-media content storage and management system merges a variety of different services into a single user interface for providing a comprehensive and efficient means for creating, communicating, and managing multi-media content materials.

Figure 2:
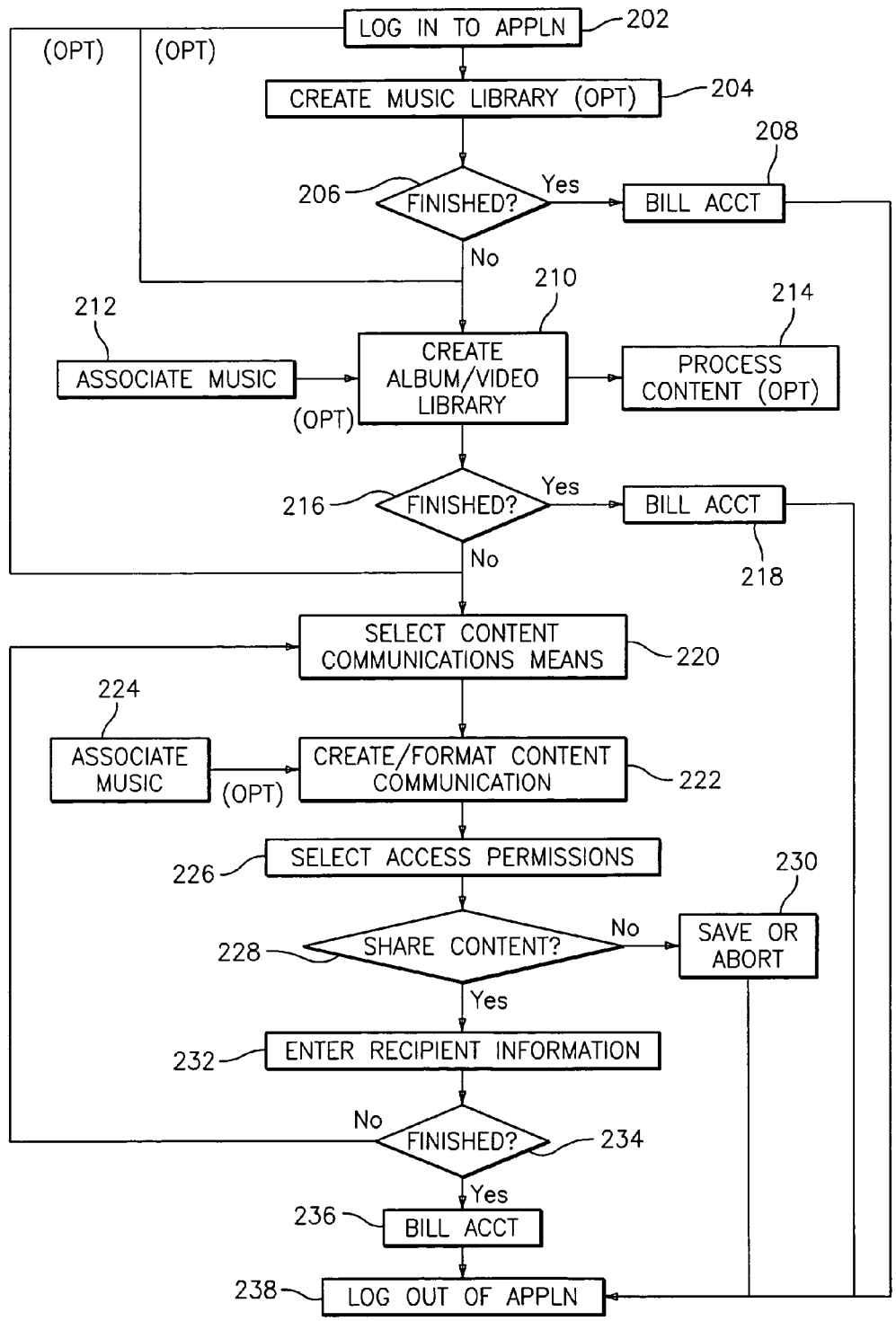
FIG. 2 illustrates a flow diagram describing a process for implementing the multi-media content storage and management system in exemplary embodiments.
Figure 3:
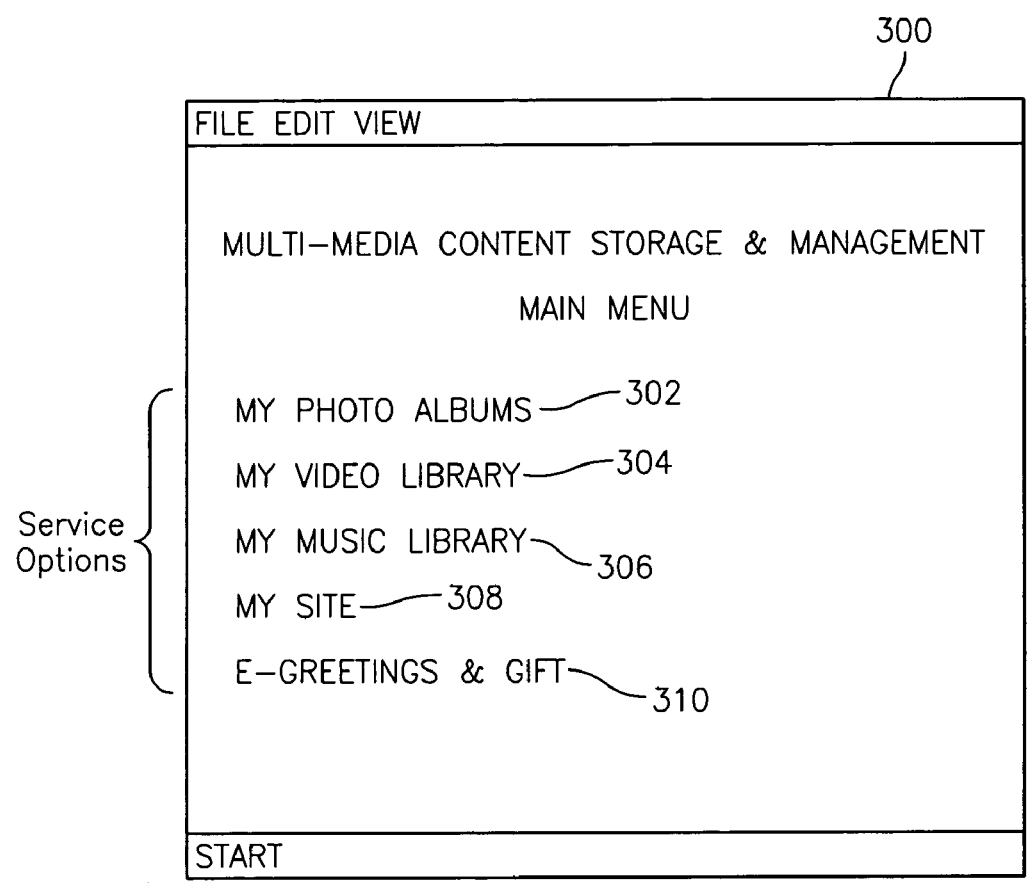
FIG. 3 illustrates a sample user interface screen and main menu for accessing the features provided by the multi-media content storage and management system in exemplary embodiments.

Referring now to FIG. 2, an exemplary process for executing the multi-media content storage and management system will now be described. A user of one of client systems 112-114 logs in to the multi-media content storage and management system at 202 and the main menu screen 300 of FIG. 3 is presented. As is shown in main menu screen 300, a user may select from a listing of service options 302-310 relating to multi-media content such as images, video, audio, text, as well as the creation, storage, and messaging of this multi-media content. Additionally, these services are linked together in such a manner that, for example, a user may create a photo album via option 302 and associate the photo album with a music selection without returning to the main menu 300.

Returning now to FIG. 2, a user who wishes to create a music library, edit a music library, or otherwise access music from a music library selects the 'my music library' option 306 from main menu screen 300 at 204. A music base of song content may be stored in storage device 106 for quick access and retrieval. When the user has completed the transaction at 206, the multi-media content storage and management system transmits the details to a billing application on one of servers 104 for tracking and billing the user's account at 208. The user then logs out of the application at 238. In alternate embodiments, the music base may be provided by a third-party service provider. In yet further embodiments, other types of content in addition to, or in lieu of, music may be provided such as movies and computer/video games.

If the user has not completed the transaction at 206, the user may continue on to 210 to create or modify a photo album or video library or, alternatively, the user may proceed directly to this option from 202 by selecting 'my photo albums' option 302 or 'my video library' option 304 from main menu screen 300. For example, a user selects my photo albums option 302 in order to upload digital images to online storage allocated for the user in storage device 106. The multi-media content storage and management system may provide software for the user (e.g., via download) for assisting the user throughout the process. The software may include editing tools for enhancing the images' quality and appearance and for designing a photo album. The user may optionally select music to be associated with the album/library from a personal music library or directly from the music base if desired at 212. The processes involved with respect to these features are similar and so the photo album feature only will be described for illustrative purposes.

Figure 4:
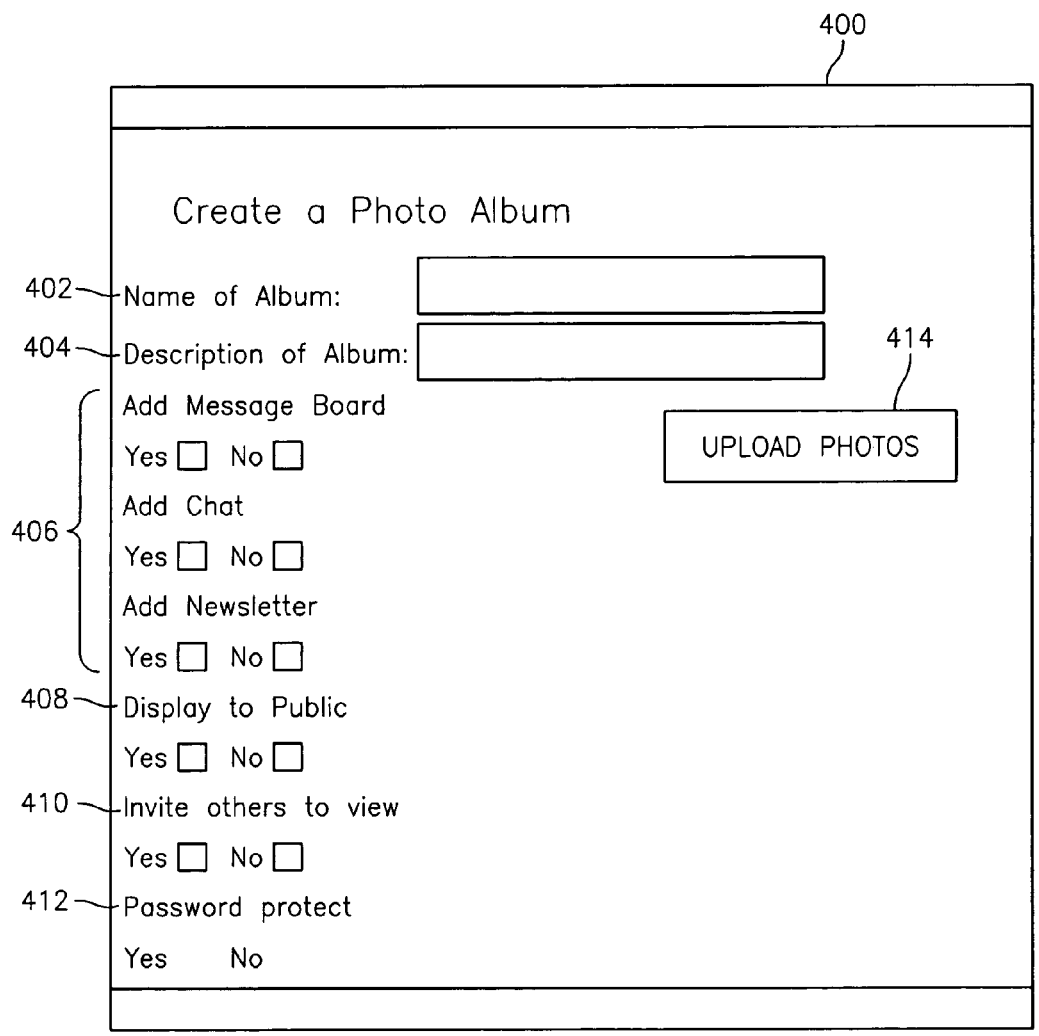
FIG. 4 illustrates a sample user interface screen for creating a photo album and related content items in exemplary embodiments.

In alternate embodiments, host system 102 may outsource an image processing service to a third party service provider at 214. The images are either directly uploaded to the third party service provider by a link or may be transmitted by the host system 102. A user selects my photo albums option 302 on main menu screen 300 and the user interface screen 400 of FIG. 4 is presented to the user. User interface screen 400 provides fields for selection and input by the user including a name field for the album to be created in 'Name of Album' field 402 and an album description field of the album in 'Description of Album' field 404. Additional options are also available to the user, such as adding content communications (e.g., a message board, a chat room, and/or a newsletter) via fields 406 as shown in FIG. 4. These features are described further herein. The user is also queried whether the photo album and related content communications should be available to the public via 'Display to Public' field 408. Access to the photo album and related content may be provided by invitation only using 'Invite others to view' field 410. The user may also password protect the photo album and related content if desired by selecting 'Yes' from the 'Password protect' field 412.

Figure 5:
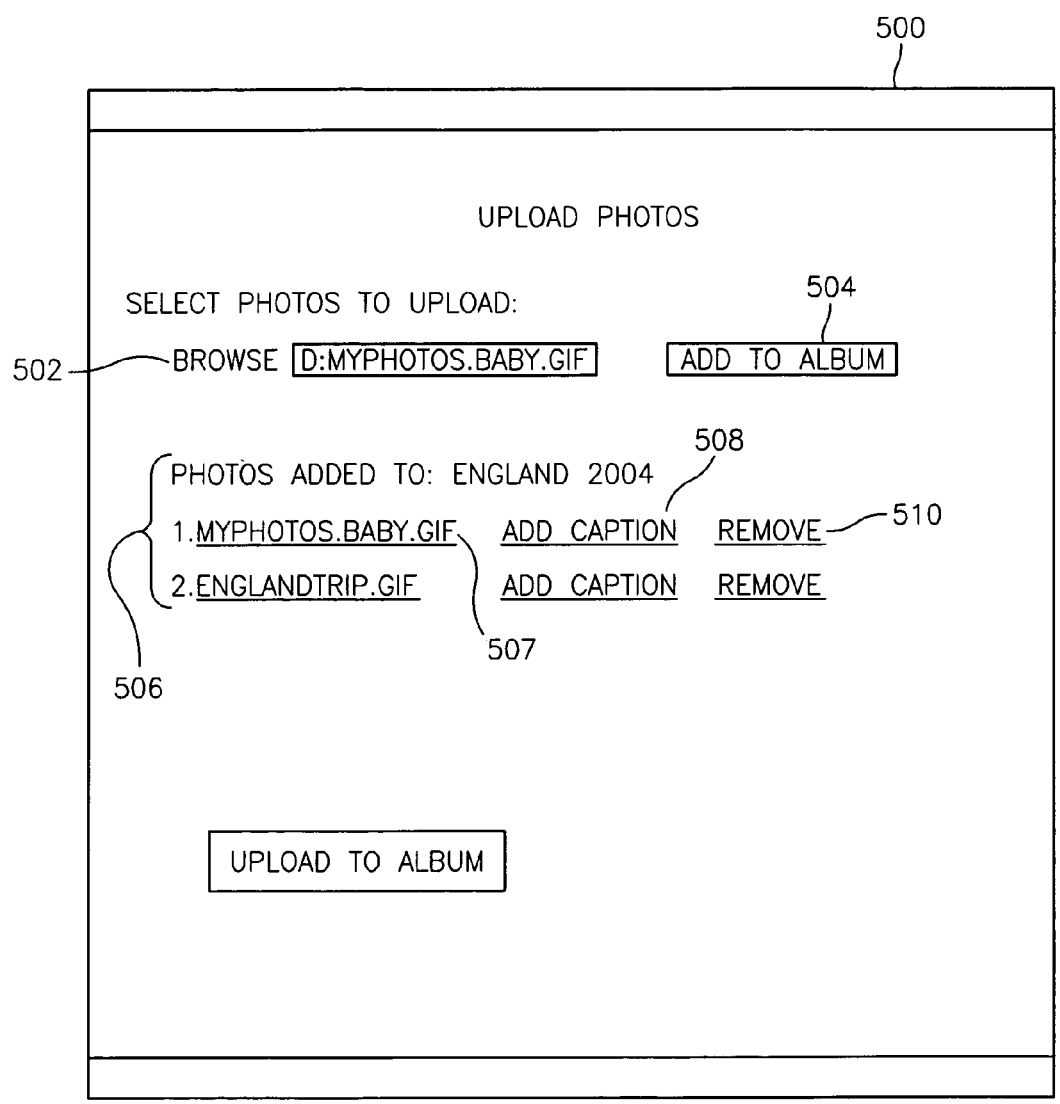
FIG. 5 illustrates a sample user interface screen for uploading and editing images and associating the images with a photo album in exemplary embodiments.

In creating a photo album, the multi-media content storage and management system may prompt the user to select frames, mats, backgrounds, etc. (not shown) for the photos to be included in the album. These selections may be provided via the software downloaded as described above. Once the selections have been made, the user selects the particular photos to be included in the album. These photos may come from images already stored online or may reside on the user's client system. If the photos reside on the user's client system, the user selects the UPLOAD PHOTOS option 416 on user interface screen 400 and the multi-media content storage and management system presents the user interface screen 500 as shown in FIG. 5.

The user may browse existing photos stored on the client system via field 502 and select the 'Add to Album' option 504 when a photo or collection is found. Uploading large digital image files may consume a significant amount of time and resources of the client system. The multi-media content storage and management system may include a 'turbo' feature that enables the user to upload (or download) content at speeds much faster than the speeds at which the client system normally functions. This 'turbo' feature may be provided as a value-added service to the user and billed each time the feature is accessed, or may be factored into the fees associated with a user account. Alternatively, a user may be granted a specific number of 'free' turbo accesses over a specified length of time and any additional use is charged to the user account.

The photos to be added to a photo album selected by the user are shown in frame 506 of user interface screen 500. Additional functionality that may be provided by the multi-media content storage and management system via the user interface screen 500 includes an editing option. A user may click on a collection of photos from frame 506 and the photos are displayed along with an editing tool for removing red-eye, size reduction, etc. The user may also add a caption by selecting the 'Add caption' option 508 next to the desired photo group. A photo may be removed from the group by selecting the 'Remove' option 510 next to the photo group presented in frame 506.

Figure 6:
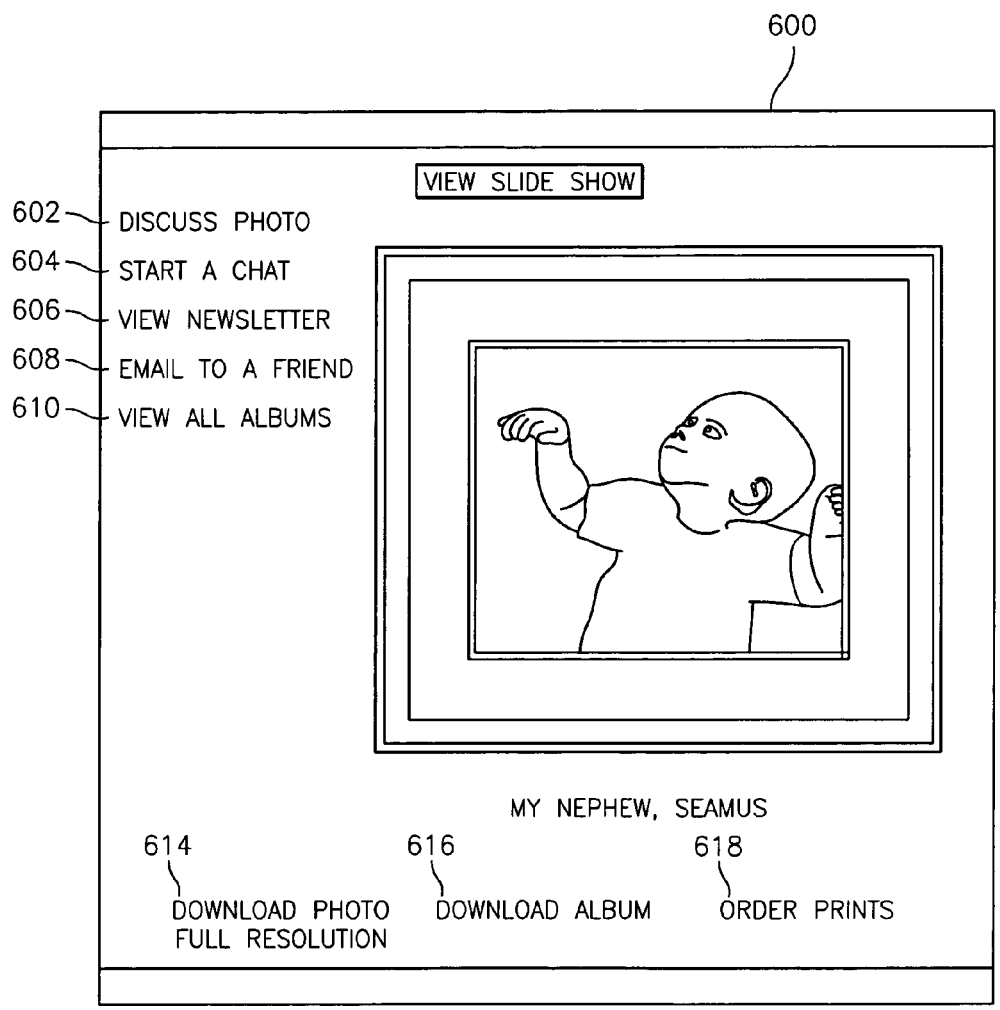
FIG. 6 illustrates a sample user interface screen including a photo album and related content items created via the user interface screens of FIGS. 4 and 5 in exemplary embodiments.

If the user has not selected any of the options provided in fields 406-412 (e.g., the user desires only to create and store the photo album), the process is finished at 216, the user's account is billed by the billing application at 218, and the user logs out of the multi-media content storage and management system at 238. A sample photo album is shown in FIG. 6. Interactive functionality may be added to the photo album as shown in FIG. 6 such as 'discuss photo' 602, 'Start a Chat' 604, 'View Newsletter' 606, 'Email to a friend' 608, and 'View all Albums' 610. Also, a slide show option 612 may be included that enables the viewer to view the album in full screen. The multi-media content storage and management system also enables a viewer to download the photo 614, download the album 616, and order prints 618. The downloading features may be enhanced via the 'turbo' option described above. Additionally, the order prints option 618 may be linked to a third party photo service provider that processes the photo and enhances its quality, size, or other editing options.

If, on the other hand, the user is not finished with the photo album at 216 (e.g., the user wishes to create and associate one or more of content communications listed in fields 406), then the process continues at 220 whereby the user selects 'Yes' from one or more of fields 406. Alternatively, the user may directly access this function by selecting 'my site' option 308 or 'e-greetings & gifts' option 310 from main menu screen 300. Host system 102 may provide users with web hosting services as described above with respect to FIG. 1. The web hosting services may include providing the user with a direct link to a domain name registration service provider for acquiring a domain name, as well as web page creation services, and web page hosting and content storage services. A user who has acquired this service may add, modify, and communicate content via a personal web site hosted by host system 102. The user may select 'my site' option 308 in order to link content in their personal photo albums, video libraries, music libraries, and communications functions (e.g., newsletter, chat room, message boards, etc.) to their personal web page using the multi-media content storage and management system.

Figure 7:
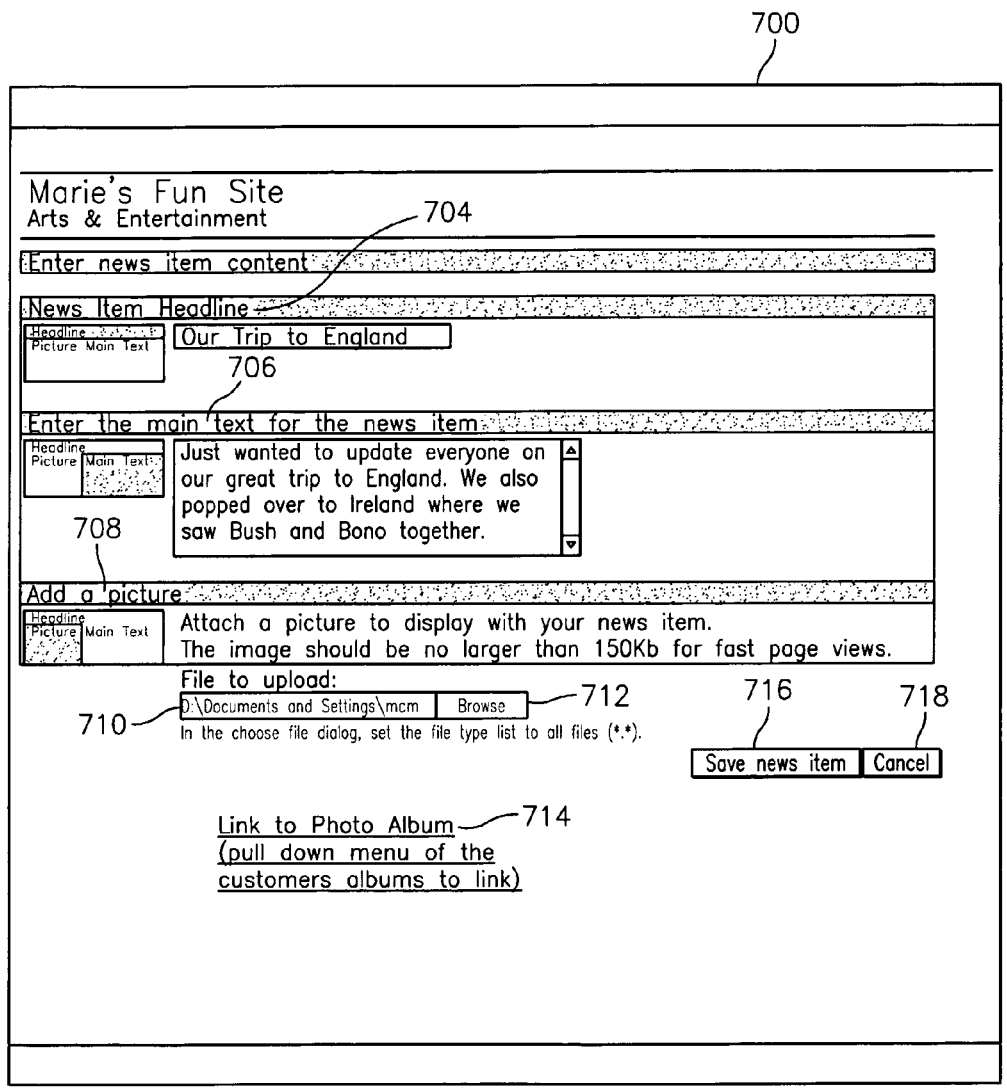
FIG. 7 illustrates a sample user interface screen for creating a newsletter and associating the newsletter with a photo album in exemplary embodiments.

A user who wishes to add additional content to a photo album, or create new content for a personal web site selects the appropriate option on screen 300 of FIG. 3 (e.g., 'my site' 308 or if in the photo album module, selects one of fields 406). For illustrative purposes, it is assumed that the user has selected a newsletter for creation. The multi-media content storage and management system displays a user interface screen 700 of FIG. 7 for creating a newsletter at 222. A user selects a newsletter template, a sample of which is shown in frame 702. A field is provided for adding a headline for the newsletter 704. The user then enters the main text for the news item in field 706. If desired, the user may add a photo to the newsletter via frame 708. This may be accomplished by uploading an image file from the user's directory on a client system or may be selected from uploaded content in the user's photo album stored in storage device 106. If the user uploads a photo from a client system, the multi-media content storage and management system provides the option of linking the photo to an existing photo album via link 714 which, upon selection, provides a pull down menu of the user's albums. Once completed, the user selects 'save news item' 716 or may select 'cancel' 718 as desired. Additionally, a user may associate selected music items from the user's music library or directly from the music base in storage device 106 if desired at 224.

Access permissions may be selected by the user at 226 for controlling the access of the created content. The user may also designate specified recipients with which the content will be shared at 228. For example, the user may provide email addresses for desired recipients of the content.

Figure 8:
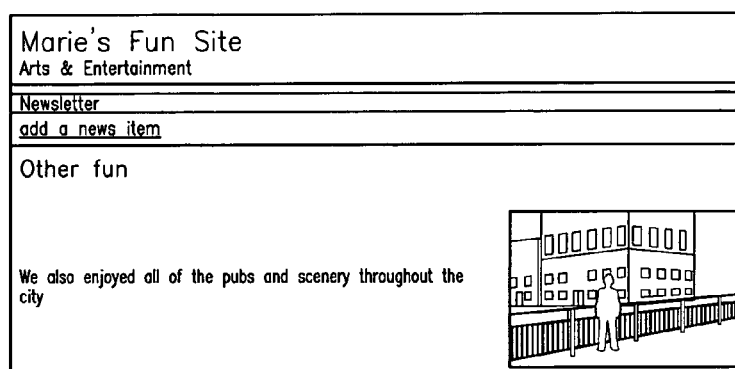
FIG. 8 illustrates a sample user interface screen and newsletter including photo album images created via the user interface screen of FIG. 7 in exemplary embodiments.

A sample newsletter created by the multi-media content storage and management system is shown in FIG. 8. The photos provided in the newsletter may be linked to a photo album whereby a viewer can select 'view the entire photo album' 804 and the collection of photos associated with the album are displayed for the viewer. The newsletter photos may also be linked to an email server (e.g., one of servers 104) whereby a viewer may send a newsletter photo to a recipient by selecting 'email to a friend' option 806.

Figure 9:
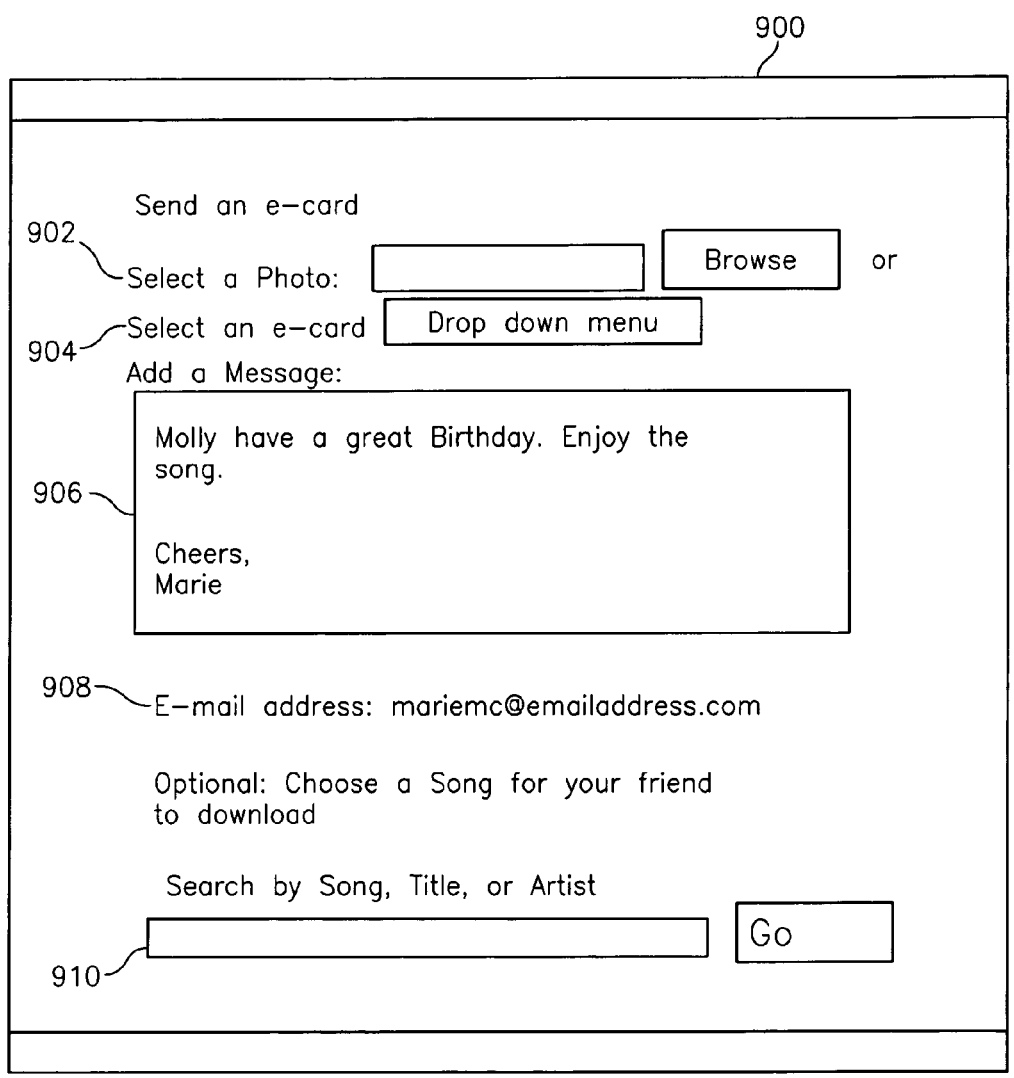
FIG. 9 illustrates a sample user interface screen for creating an electronic greeting via the multi-media content storage and management system in exemplary embodiments.
Figure 10:
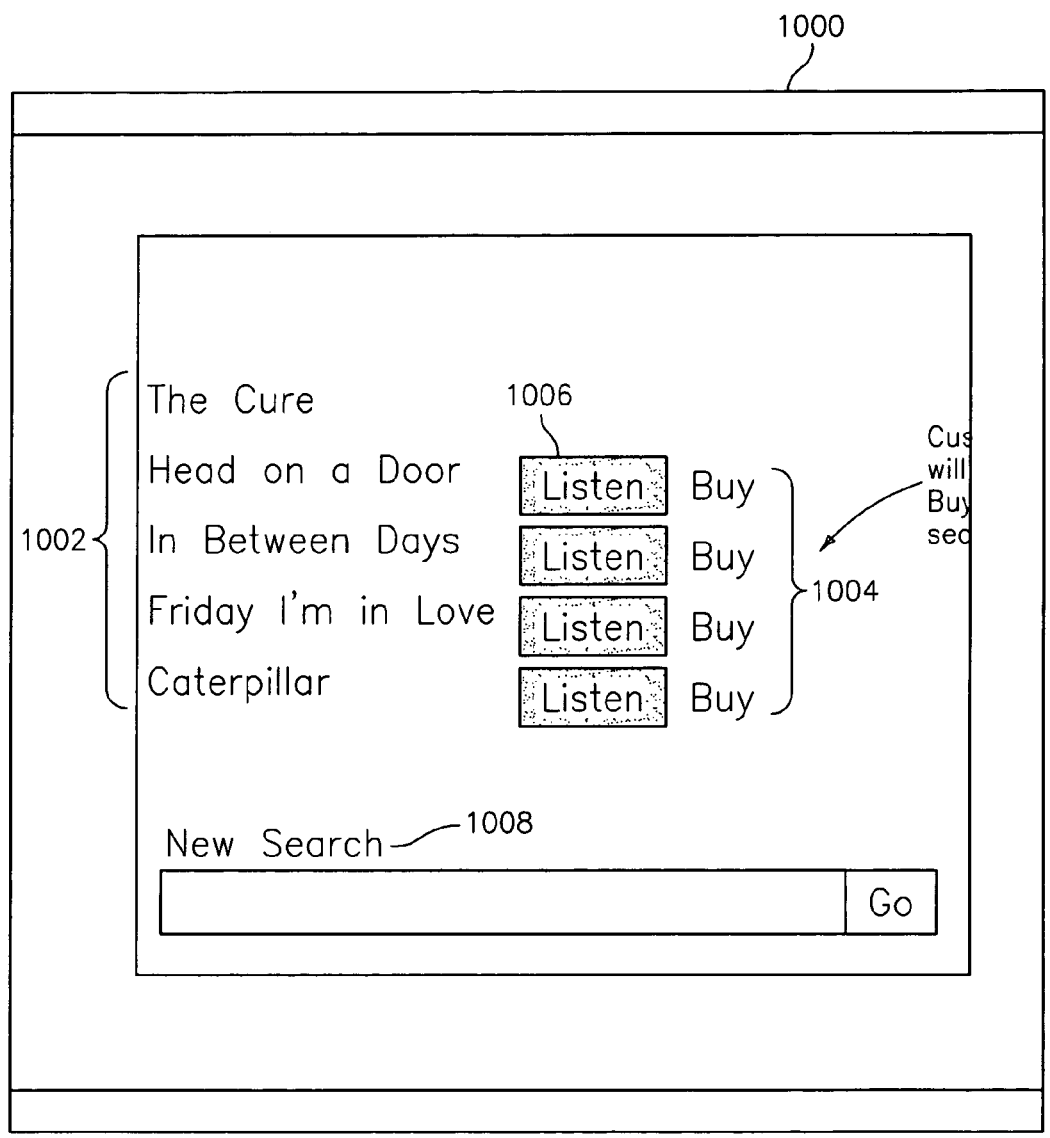
FIG. 10 illustrates a sample user interface screen for attaching one or more music selections to an electronic greeting created via the user interface screen of FIG. 9.
Figure 11:
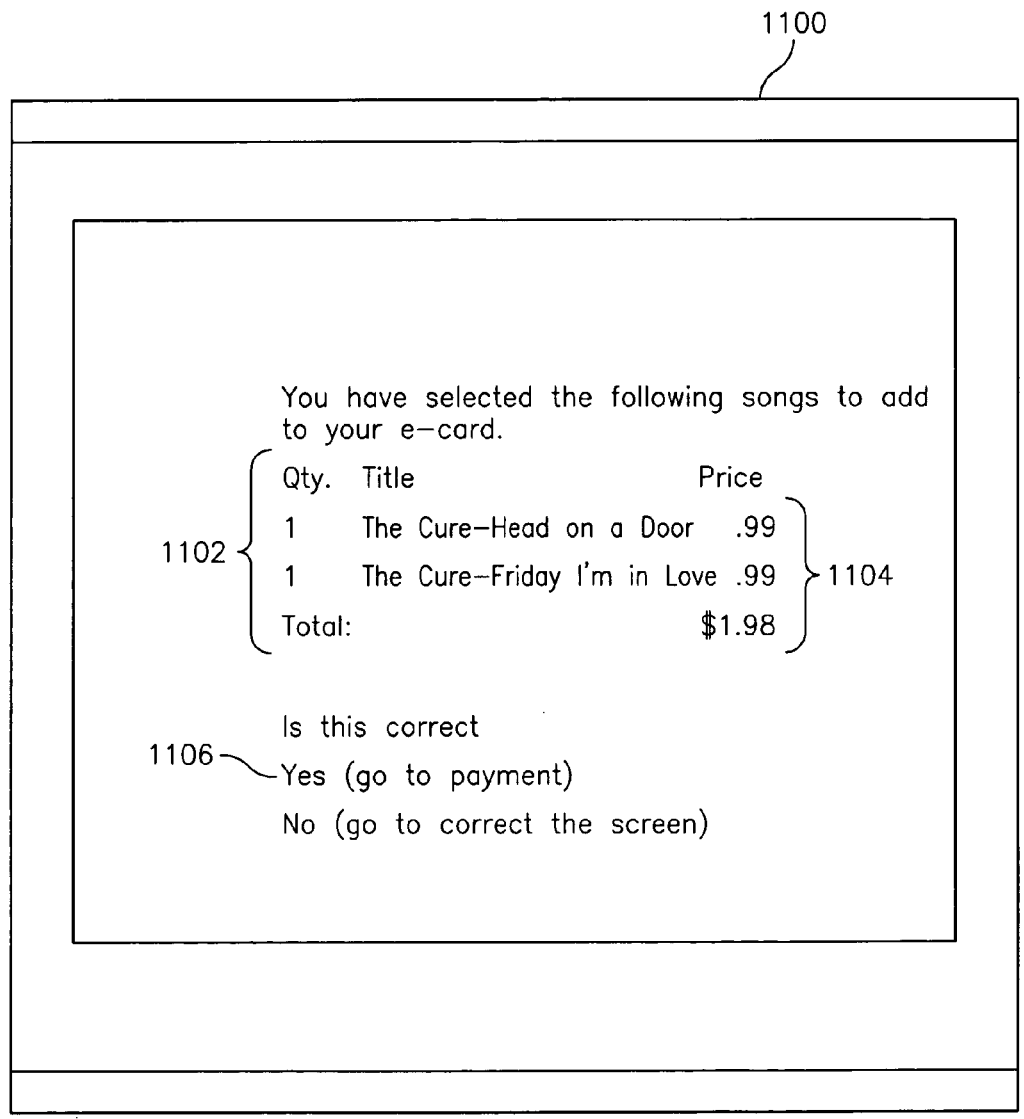
FIG. 11 illustrates a sample user interface screen with selected music items, prices, and payment instructions for attaching a music selection to an electronic greeting created via the user interface screen of FIGS. 9 and 10.

Other content communications may be selected by a user in addition to newsletters as described above at 220. The multi-media content storage and management system includes an electronic greetings (e-greetings) and gifts module 310 as described herein. E-greetings may comprise an electronic card with a personalized text message, and may also include an attached photo, video, music, movie, or other similar type of content (e.g., a gift from the user). A user accesses this feature by selecting 'e-greetings & gifts' option 310 from main menu screen 300 and the user interface screen 900 of FIG. 9 is presented. If desired, the user selects a photo via field 902 or may simply select an e-card without a photo via field 904. Field 904 may include a drop down list of available cards for selection. A personalized message may be added via text box 906. The user enters the email address of the recipient in field 908. Optionally, the user may associate a song, movie, video, or other item to the e-card via field 910. Once selected, the multi-media content storage and management system presents the user interface screen 1000 of FIG. 10. Screen 1000 displays the selections 1002, along with a link to purchase the item 1004, and may include an option to preview the selection before purchasing via field 1006. The user may then perform a new search if desired via field 1008 if the current selection is not satisfactory. Once the selections have been made, the multi-media content storage and management system presents a user interface screen 1100 of FIG. 11 displaying the selections 1102 and their costs 1104. The user interface screen 1100 also prompts the user to proceed to a payment screen (not shown) via field 1106.

Figure 12:
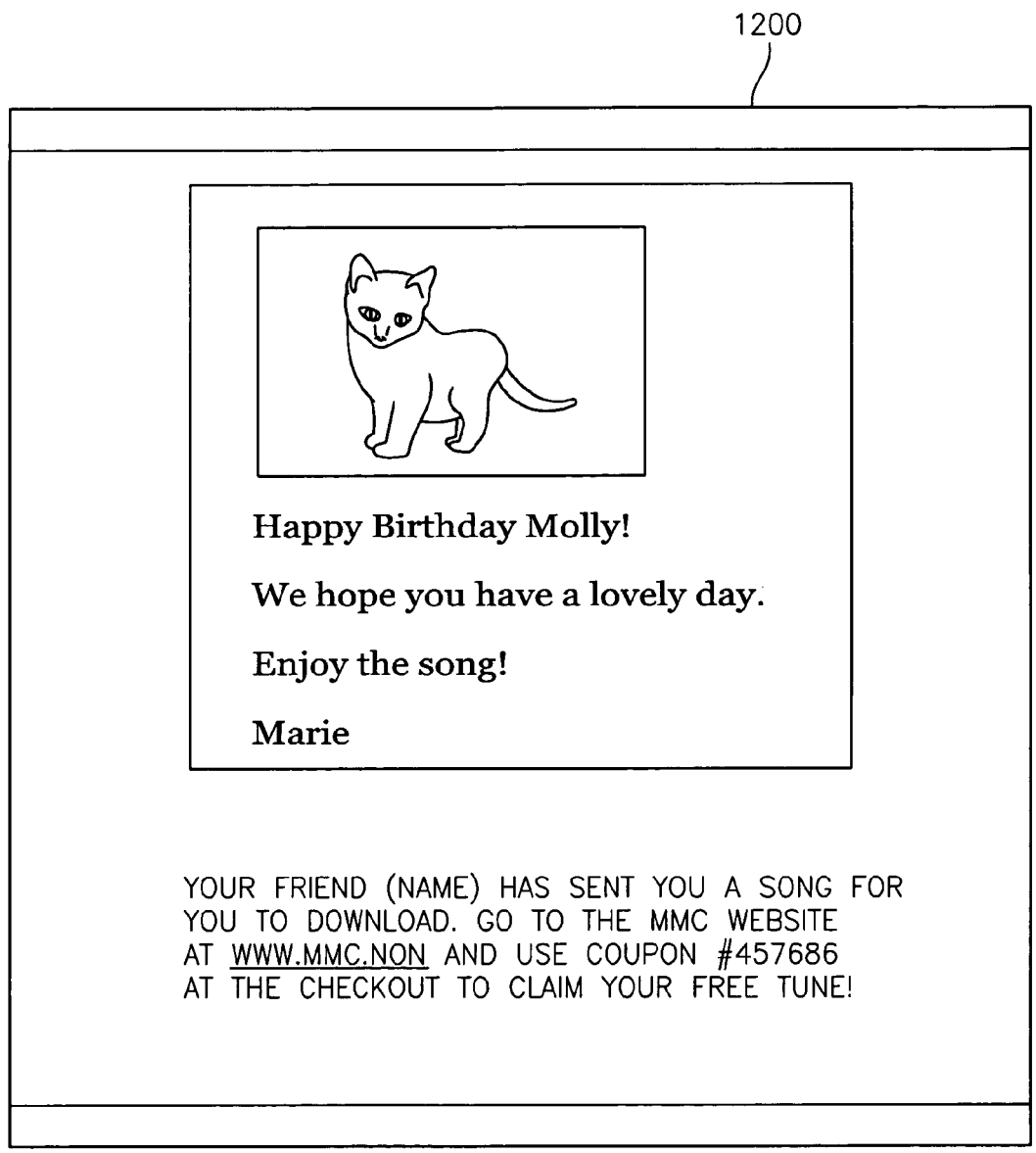
FIG. 12 illustrates a sample electronic greeting created via the user interface screens of FIGS. 9-11.
Figure 13:
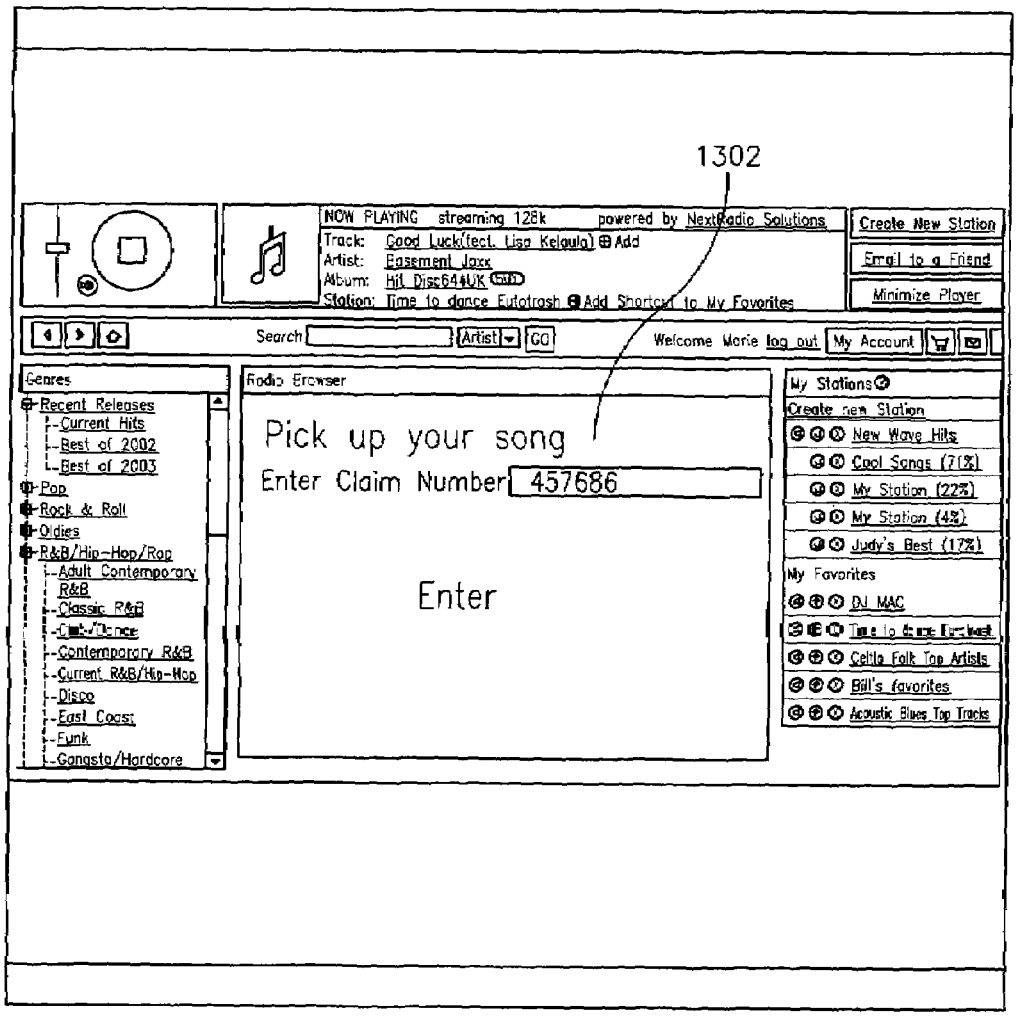
FIG. 13 illustrates a sample user interface screen for retrieving a music selection acquired by a recipient of an electronic greeting in exemplary embodiments.

A sample e-greeting is shown in FIG. 12. If a 'gift' has been associated with the e-greeting, instructions are provided in screen 1200 for accessing the gift. A web site address may be provided to the recipient of the e-greeting for retrieving the gift item as well as a unique code. A sample user interface screen for retrieving the gift is shown in FIG. 13. A field 1302 is shown that prompts the recipient to pick up their gift. The recipient enters the code provided to them in the e-greeting and a link for downloading the gift item is presented to the recipient. Host system 102 may employ digital rights management techniques for controlling access to content that may be protected by copyright, licensing, etc.

As described above, the present invention can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for providing multi-media content storage and management services, comprising:

from a single user interface:
creating a library of content items comprising at least one of a photo library and a video library;
creating at least one other content item comprising an electronic greeting, wherein the electronic greeting includes an electronic greeting card and a personalized message, wherein the electronic greeting further includes a gift associated with a unique code, the gift comprising a: music selection, movie, computer game, and video game, wherein the gift is retrievable via electronic download upon entry of the unique code; and
associating at least one component of the library with the electronic greeting to form an arrangement, wherein the single user interface provides transactional services including selecting, editing, billing, purchasing and delivering of the arrangement to one of a user, a designated recipient of the user and a third party service provider, and wherein the delivering of the arrangement includes uploading and downloading using a free turbo feature granted to the user for a specific number of free high-speed uploads and free high-speed downloads of the arrangement.

2. The method of claim 1, associating a music selection with the arrangement.

3. The method of claim 1, wherein creating the library of content items includes:
editing components of the library; and
adding captions to components of the library.

4. The method of claim 1, wherein creating the library of content items further includes transmitting the library of content items to the third party service provider for processing.

5. The method of claim 1, further comprising tracking activities conducted relating to the content items and linking the activities to a billing system.

6. The method of claim 1, wherein the library of content items is uploaded or downloaded via a single access high-speed turbo component.

7. A system for providing multi-media content storage and management services, comprising:
a host system comprising at least one server executing a web server application, a real-time media delivery application; and a multi-media content storage and management application; and
a link to a client system;
wherein the multi-media content storage and management application includes providing a single user interface to the client system, and wherein the single user interface is operable for enabling the client system to perform:
creating a library of content items comprising at least one of a photo library and a video library;
creating at least one other content item comprising an electronic greeting, wherein the electronic greeting includes an electronic card and a personalized message, wherein the electronic greeting further includes a gift associated with a unique code, the gift comprising a: music selection, movie, computer game, and video game, and wherein the gift is retrievable via electronic download upon entry of the unique code; and
associating at least one component of the library with the electronic greeting to form an arrangement, wherein the single user interface provides transactional services including selecting, editing, billing, purchasing and delivering of the arrangement to one of a user, a designated recipient of the user and a third party service provider, and wherein the delivering of the arrangement includes uploading and downloading using a free turbo feature granted to the user for a specific number of free high-speed uploads and free high-speed downloads of the arrangement.

8. The system of claim 7, further comprising a storage device in communication with the host system, the storage device housing multi-media content.

9. The system of claim 8, wherein the multi-media content includes music, wherein the user interface is further operable for enabling the client system to perform associating a music selection with the arrangement.

10. The system of claim 7, wherein creating the library of content items includes:
editing components of the library; and
adding captions to components of the library.

11. The system of claim 7, further comprising a link to the third party service provider, wherein creating the library of content items further includes transmitting the library of content items to the third party service provider for processing.

12. The system of claim 7, wherein the at least one server executes a billing application, wherein the server tracks activities conducted relating to the content items and transmits details of the activities to the billing application.

13. The system of claim 7, wherein the library of content items is uploaded or downloaded via a single access high-speed turbo component provided by the user interface.

14. A storage medium encoded with machine-readable program code for providing multi-media content storage and management services, the program code including instructions for causing a computer to implement a method, comprising:
from a single user interface of the computer:
creating a library of content items comprising at least one of a photo library and a video library;
creating at least one other content item comprising an electronic greeting, wherein the electronic greeting includes an electronic card and a personalized message, wherein the electronic greeting further includes a gift associated with a unique code, the gift comprising a: music selection, movie, computer game, and video game, and wherein the gift is retrievable via electronic download upon entry of the unique code; and
associating at least one component of the library with the at least one other content item to form an arrangement, wherein the single user interface provides transactional services including selecting, editing, billing, purchasing and delivering of the arrangement to one of a user, a designated recipient of the user and a third party service provider, and wherein the delivering of the arrangement includes uploading and downloading using a free turbo feature granted to the user for a specific number of free high-speed uploads and free high-speed downloads of the arrangement.

* * * * *